(12) United States Patent
Pang et al.

(10) Patent No.: US 9,128,711 B2
(45) Date of Patent: Sep. 8, 2015

(54) METHOD, COMPUTER SYSTEM AND CONTROL DEVICE FOR REDUCING POWER CONSUMPTION

(75) Inventors: Shanna Pang, Beijing (CN); Zhiqiang Hui, Beijing (CN); Chin-Hwaun Wu, Taipei County (TW); Cheng-Wei Huang, Taipei County (TW)

(73) Assignee: VIA TECHNOLOGIES, INC., Hsin-Tien, Taipei (TW)

( * ) Notice: Subject to any disclaimer, the term of this patent is extended or adjusted under 35 U.S.C. 154(b) by 1550 days.

(21) Appl. No.: 12/193,166

(22) Filed: Aug. 18, 2008

(65) Prior Publication Data
US 2009/0055669 A1 Feb. 26, 2009

Related U.S. Application Data

(60) Provisional application No. 60/957,715, filed on Aug. 24, 2007.

(51) Int. Cl.
*G06F 1/32* (2006.01)

(52) U.S. Cl.
CPC ............ *G06F 1/3215* (2013.01); *G06F 1/3253* (2013.01)

(58) Field of Classification Search
CPC .. G06F 1/3253; Y02B 20/42; Y02B 60/1235; Y02B 60/42; Y02B 60/14; H04L 1/0002
USPC ............. 710/33, 36, 46, 58, 7, 220, 240, 260, 710/261; 713/300, 320, 322
See application file for complete search history.

(56) References Cited

U.S. PATENT DOCUMENTS

| | | | |
|---|---|---|---|
| 2001/0011311 A1* | 8/2001 | Takeda | 710/61 |
| 2002/0116565 A1* | 8/2002 | Wang et al. | 710/313 |
| 2003/0005272 A1* | 1/2003 | Nalawadi et al. | 713/1 |
| 2003/0058852 A1* | 3/2003 | Luhmann et al. | 370/389 |
| 2003/0177297 A1* | 9/2003 | Hesse et al. | 710/305 |
| 2004/0025099 A1* | 2/2004 | Aikawa et al. | 714/748 |
| 2004/0123169 A1* | 6/2004 | Elnozahy et al. | 713/320 |
| 2005/0078696 A1* | 4/2005 | Oner | 370/419 |
| 2006/0123180 A1* | 6/2006 | Derr et al. | 710/308 |
| 2007/0192515 A1* | 8/2007 | Kraus | 710/22 |
| 2007/0233909 A1* | 10/2007 | Derr et al. | 710/36 |
| 2008/0005445 A1* | 1/2008 | Diefenbaugh et al. | 710/313 |
| 2008/0052543 A1* | 2/2008 | Sokorac | 713/300 |
| 2008/0133952 A1* | 6/2008 | Gan et al. | 713/322 |

* cited by examiner

*Primary Examiner* — Kim Huynh
*Assistant Examiner* — Brandon Kinsey
(74) *Attorney, Agent, or Firm* — McClure, Qualey & Rodack, LLP

(57) ABSTRACT

A computer system is provided. In one embodiment, the computer system includes a memory, a peripheral device, a central processing unit (CPU), and a peripheral device controller. The CPU stores information about the data transmission in a descriptor in the memory when data transmission between the CPU and the peripheral device is required. The peripheral device controller reads the descriptor from the memory at an access frequency, records whether the descriptor read from the memory requests for data transmission as a recording result, and adjusts the access frequency according to the recording result.

10 Claims, 6 Drawing Sheets

METHOD, COMPUTER SYSTEM AND CONTROL DEVICE FOR REDUCING POWER CONSUMPTION

CROSS REFERENCE TO RELATED APPLICATIONS

This application claims the benefit of U.S. Provisional Application No. 60/957,715.

BACKGROUND OF THE INVENTION

1. Field of the Invention

The invention relates to computer systems, and more particularly to power consumption of computer systems.

2. Description of the Related Art

A computer system changes power consumption of a central processing unit (CPU) thereof according to its operating status. When computer load is reduced, the computer system lowers power consumption of the CPU for power saving. For example, an operating frequency of the CPU is reduced, and an operating voltage of the CPU is also lowered, thus reducing power consumption of the CPU. On the contrary, when computer load is increased, the computer system increases power consumption of the CPU, thus allowing the CPU to process more computing tasks during a predetermined period.

For example, Advanced Configuration and Power Interface (ACPI) is a standard for computer systems. In the ACPI standard, power consumption of a CPU is divided into five statuses including a C0, C1, C2, C3, and C4 status. The C0 status is an active status in which power consumption of a CPU is the highest. The C1 status is a halt status in which a CPU consumes less power than that during the C0 status. The C2 status is a stop status, and the C3 status is a sleep status, wherein the power consumption of a CPU is even further reduced. Finally, the C4 status is a deep-sleep status in which power consumption of a CPU is the lowest. Thus, a computer system dynamically adjusts the power consumption status of a CPU thereof, according to its operating status.

Referring to FIG. 1, a schematic diagram of switching of a power consumption status of a CPU according to the ACPI standard is shown. To begin, a computer operating system continues to evaluate an operating status of its CPU to determine whether to change a power consumption status of the CPU. In one embodiment, a Basic Input and Output System (BIOS) of the computer system evaluates the operating status of the CPU to determine whether to change the power consumption status of the CPU.

Peripheral devices are ordinarily coupled to a CPU via a control device. For example, a Universal Serial Bus (USB) device is coupled to a CPU via a control device such as a chipset. The control device includes a USB controller for handling data transmission between the USB device and the CPU. When the CPU requires data transmission with the USB device, the CPU stores information about data transmission in a descriptor in a memory coupled to the control device. The USB device reads the descriptor from the memory to understand information about the data transmission requested by the CPU. The USB device performs data transmission according to the descriptor.

The USB device therefore accesses the memory to read the descriptor to know whether data transmission between the CPU and the USB device has been requested. In addition, the USB device accesses the memory in a high enough frequency to ensure a short delay of data transmission. When the USB device accesses the memory at a high frequency, the control device, however, continues to operate even during an idle state, prohibiting the CPU from entering a C3 sleep status or a C4 deep-sleep status. Thus, when a USB device is connected to the computer system, power consumption of the CPU is prevented from being reduced. As such, the conventional method for reducing power consumption of a computer system is deficient. Thus, another method for reducing power consumption of a computer system is therefore required.

BRIEF SUMMARY OF THE INVENTION

The invention provides a method for reducing power consumption of a computer system. In one embodiment, when a central processing unit (CPU) requests a peripheral device for data transmission there between, the CPU stores information about the data transmission in a descriptor in a memory, and the peripheral device handles the data transmission according to the descriptor. The peripheral device is directed to read the descriptor from the memory at an access frequency. Whether the descriptor read from the memory requests, for data transmission, is recorded as a recording result. The access frequency is adjusted according to the recording result.

The invention provides a computer system. In one embodiment, the computer system includes a memory, a peripheral device, a CPU, and a peripheral device controller. The CPU stores information about the data transmission in a descriptor in the memory when data transmission between the CPU and the peripheral device is required. The peripheral device controller reads the descriptor from the memory at an access frequency, records whether the descriptor read from the memory requests for data transmission as a recording result, and adjusts the access frequency according to the recording result.

The invention also provides a control device, installed in a computer system, coupled to a central processing unit (CPU), a memory, and a peripheral device. In one embodiment, when the CPU requests the peripheral device for data transmission there between, the CPU stores information about the data transmission in a descriptor in the memory. In one embodiment, the control device includes a peripheral device controller and a processor bus controller. The peripheral device controller reads the descriptor from the memory at an access frequency, records whether the descriptor read from the memory requests for data transmission as a recording result, and adjusts the access frequency according to the recording result. The processor bus controller controls data transmission of the CPU.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
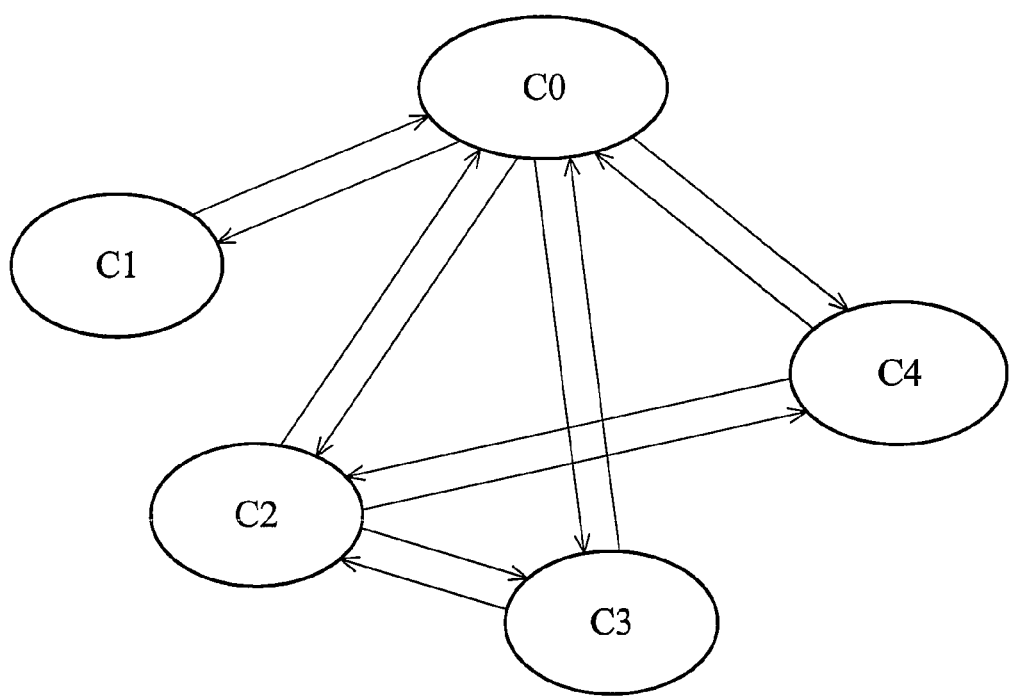
FIG. 1 is a schematic diagram of switching of a power consumption status of a CPU according to the ACPI standard.
Figure 2:
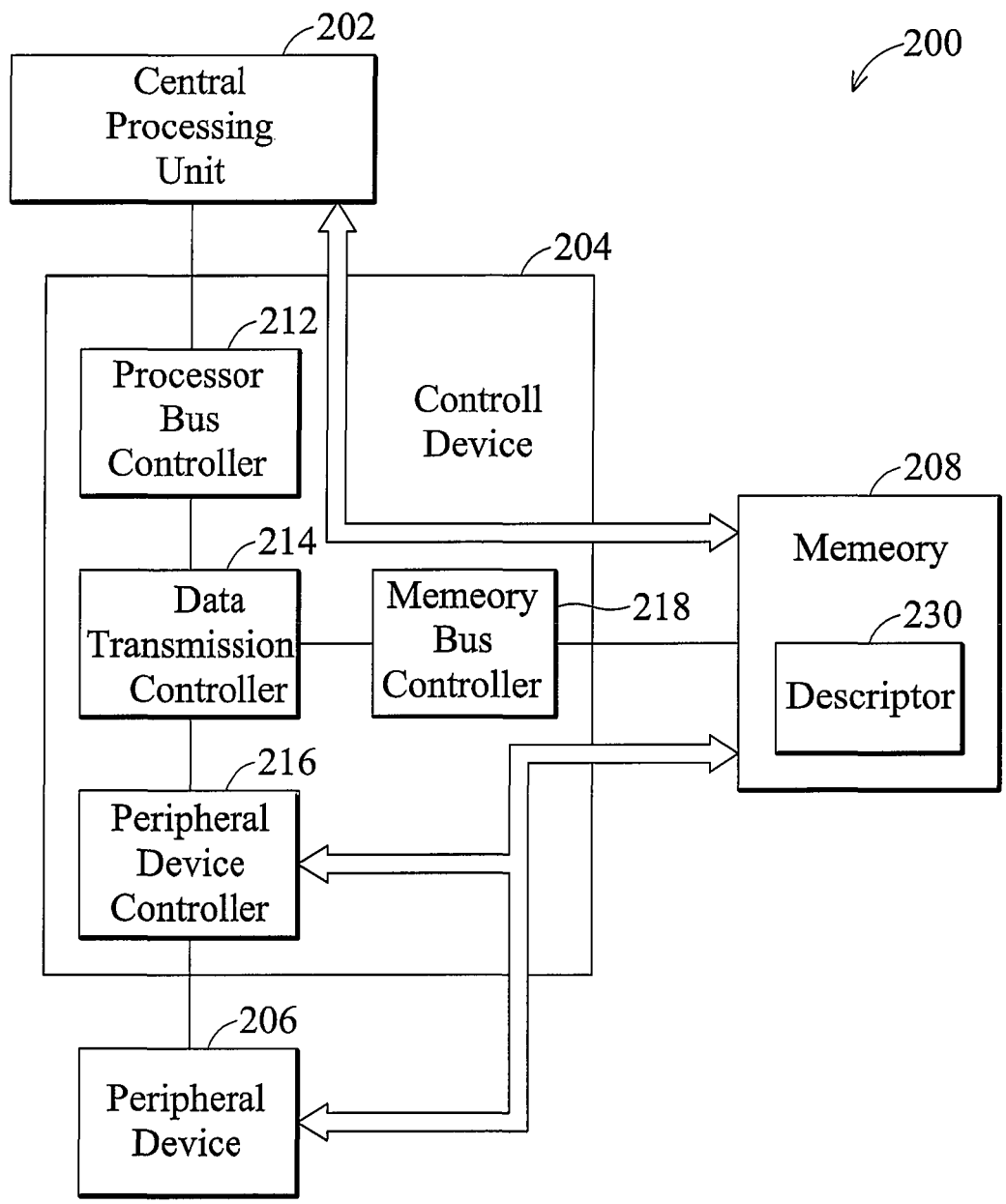
FIG. 2 is a block diagram of an embodiment of a computer system capable of reducing power consumption of a CPU thereof according to the invention.

FIG. 2 is a block diagram of a computer system 200 capable of reducing power consumption of a CPU thereof according to the invention. The computer system 200 includes a CPU 202, a control device 204, a memory 208, and a peripheral device 206. The CPU 202 handles computing of the computer system 200, and the computing result is stored in the memory 208. The control device 204 is coupled between the CPU 202, the memory 208, and the peripheral device 206 and responsible for data transmission there between. In one embodiment, the control device 204 is a chipset. The peripheral device 206 is coupled to the control device 204 via a peripheral device controller 216. The peripheral device 206 may be a SATA hard disk, a USB device, a NAND flash, or an iSCSI virtual disk. In one embodiment, the memory 208 is a Dynamic Random Access Memory (DRAM).

The control device 204 includes a processor bus controller 212, a memory bus controller 218, a peripheral device controller 216, and a data transmission controller 214. The processor bus controller 212 is coupled to the CPU 202 and handles data transmission of the CPU 202. The memory bus controller 218 is coupled to the memory 208 and handles data transmission of the memory 208. The peripheral device controller 216 is coupled to the peripheral device 206 and handles data transmission of the peripheral device 206. The data transmission controller 214 is coupled to the processor bus controller 212, the memory bus controller 218, and the peripheral device controller 216, and handles data transmission between the CPU 202, the memory 208, and the peripheral device 206.

In one embodiment, the computer system 200 further includes an operating system code automatically loaded into the CPU 202 for execution after the computer system 200 is started. The operating system (OS) evaluates an operating status of the CPU 202 according to an operating status of the control device 204. In another embodiment, the computer system 200 further includes a BIOS code automatically loaded into the CPU 202 for execution after the computer system 200 is started. The BIOS evaluates an operating status of the CPU 202 according to an operating status of the control device 204. In an embodiment, the operating system adjusts the power consumption of the CPU 202. When the work load of the CPU 202 is lowered, the operating system lowers power consumption of the CPU 202 for energy saving. For example, an operating frequency or an operating voltage of the CPU 202 is lowered to lower power consumption of the CPU 202. When the work load of the CPU 202 is raised, the operating system raises power consumption of the CPU 202, thus allowing the CPU 202 to have greater computing capability. For example, an operating frequency or an operating voltage of the CPU 202 is raised to increase power consumption of the CPU 202.

When the CPU 202 requires data transmission between the peripheral device 206 and the CPU 202, the CPU 202 stores information about data transmission in a descriptor 230 in the memory 208. In one embodiment, the descriptor 230 includes information of a data transmission type and length of transmitted data. After the descriptor 230 is stored in the memory 208, the peripheral device controller 216 accesses the memory 208 to read the descriptor 230. The peripheral device controller 216 passes the descriptor 230 to the peripheral device 206 and stores a response of the peripheral device 206 in the descriptor 230. The CPU 202 reads the descriptor 230 to know the response of the peripheral device 206. The peripheral device controller 216 handles data transmission between the CPU 202 and the peripheral device 206 according to information of the descriptor 230.

If the peripheral device controller 216 accesses the descriptor 230 at a normal frequency, because the operating system detects the operating status of the control device 204 to evaluate a computing load of the CPU 202, the CPU 202 is tricked to believe that it has some computing tasks to be processed, and the computer system 200 does not enter into a C3 sleep status or a C4 deep-sleep status. The power consumption of the CPU 202 therefore is not reduced. In one embodiment, when the CPU 202 requests data transmission with the peripheral device 206, the CPU 202 stores a null descriptor 230 to the memory 208 with a number less than a threshold (such as 8 times but not limited to the number), wherein the null descriptor does not request data transmission or records data transmission information. The peripheral device controller 216 can therefore determine whether data transmission between the CPU 202 and the peripheral device 206 is occurring according to the number of the null descriptor 230 read from the memory 208. In another embodiment, the peripheral device controller 216 records the time of receiving the null descriptor 230 continuously to determine whether data transmission between the CPU 202 and the peripheral device 206 is occurring. In another embodiment, the peripheral device controller 216 sets an idle number to a constant in advance. If the null descriptor 230 is read, the peripheral device controller 216 decreases the idle number by one. Thus, the peripheral device controller 216 can therefore determine whether data transmission between the CPU 202 and the peripheral device 206 is occurring according to the idle number. If data transmission is not performed by the CPU 202, the peripheral device controller 216 reduces a frequency for accessing the descriptor 230, thus allowing the computer system 200 to enter a C3 sleep status or a C4 deep-sleep status to reduce power consumption of the CPU 202.

Figure 3:
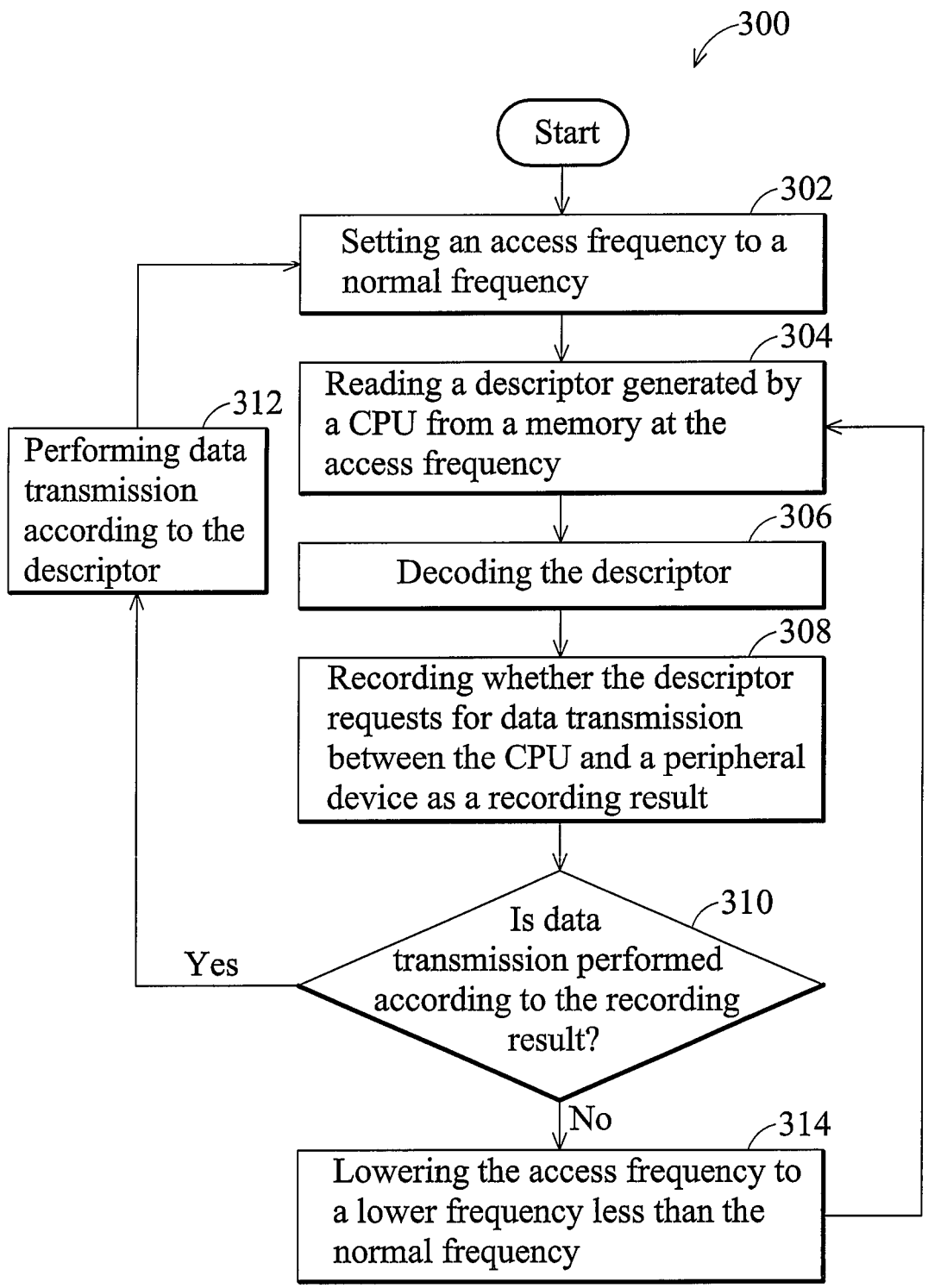
FIG. 3 is a flowchart of an embodiment of a method for reducing power consumption of a computer system according to the invention.

Referring to FIG. 3, a flowchart of a method 300 for reducing power consumption of a computer system 200 according to the invention is shown. A peripheral device controller 216 sets an access frequency to a normal frequency (step 302). The peripheral device controller 216 reads the descriptor 230 generated by the CPU 202 from the memory 208 in the access frequency (step 304). The peripheral device controller 216 decodes the descriptor 230 to obtain information about data transmission (step 306). The peripheral device controller 216 records whether the descriptor 230 requests for data transmission between the CPU 202 and the peripheral device 206 as a recording result (step 308). The peripheral device controller 216 determines whether data transmission is performed according to the recording result (step 310). If so, the peripheral device controller 216 handles data transmission between the peripheral device 206 and the CPU 202 according to the descriptor 230 (step 312) and again the peripheral device controller 216 sets the access frequency to the normal frequency (step 302) If not, the access frequency is lowered to a lower frequency less than the normal frequency (step 314).

In one embodiment, the peripheral device controller 216 sets an idle number to a predetermined constant. When the descriptor 230 read from the memory 208 does not request for data transmission, the peripheral device controller 216 increases the idle number by one. When the idle number is greater than or equal to a predetermined threshold number, the peripheral device controller 216 lowers the access frequency to the lower frequency. Otherwise, when the descriptor 230 read from the memory 208 requests data transmission, the peripheral device controller 216 sets the access frequency to a normal frequency, and resets the idle number to the predetermined constant. In another embodiment, the peripheral device controller 216 sets an idle time period to a predetermined constant. When the descriptor 230 read from the memory 208 does not request for data transmission, the peripheral device controller 216 records the idle time period wherein no data transmission between the CPU 202 and the peripheral device 206 is performed. When the idle time period is greater than or equal to a predetermined threshold period, the peripheral device controller 216 lowers the access frequency to the lower frequency. Otherwise, when the descriptor 230 read from the memory 208 requests data transmission, the peripheral device controller 216 sets the access frequency to a normal frequency, and resets the idle time period to the predetermined constant.

In another embodiment, the peripheral device controller 216 sets an idle number to a predetermined constant in advance. When the descriptor 230 read from the memory 208 does not request data transmission, the peripheral device controller 216 decreases the idle number by one. When the idle number is less than or equal to a predetermined threshold number, the peripheral device controller 216 lowers the access frequency to the lower frequency. Otherwise, when the descriptor 230 read from the memory 208 requests data transmission, the peripheral device controller 216 sets the access frequency to a normal frequency, and resets the idle number to the predetermined constant. Thus, after the access frequency is set to the lower frequency, the peripheral device controller 216 reads the memory 208 in the lower frequency. Because lowering the access frequency allows the operating system to enter into a C3 sleep status or a C4 deep-sleep status, power consumption of the CPU 202 is reduced.

Figure 4:
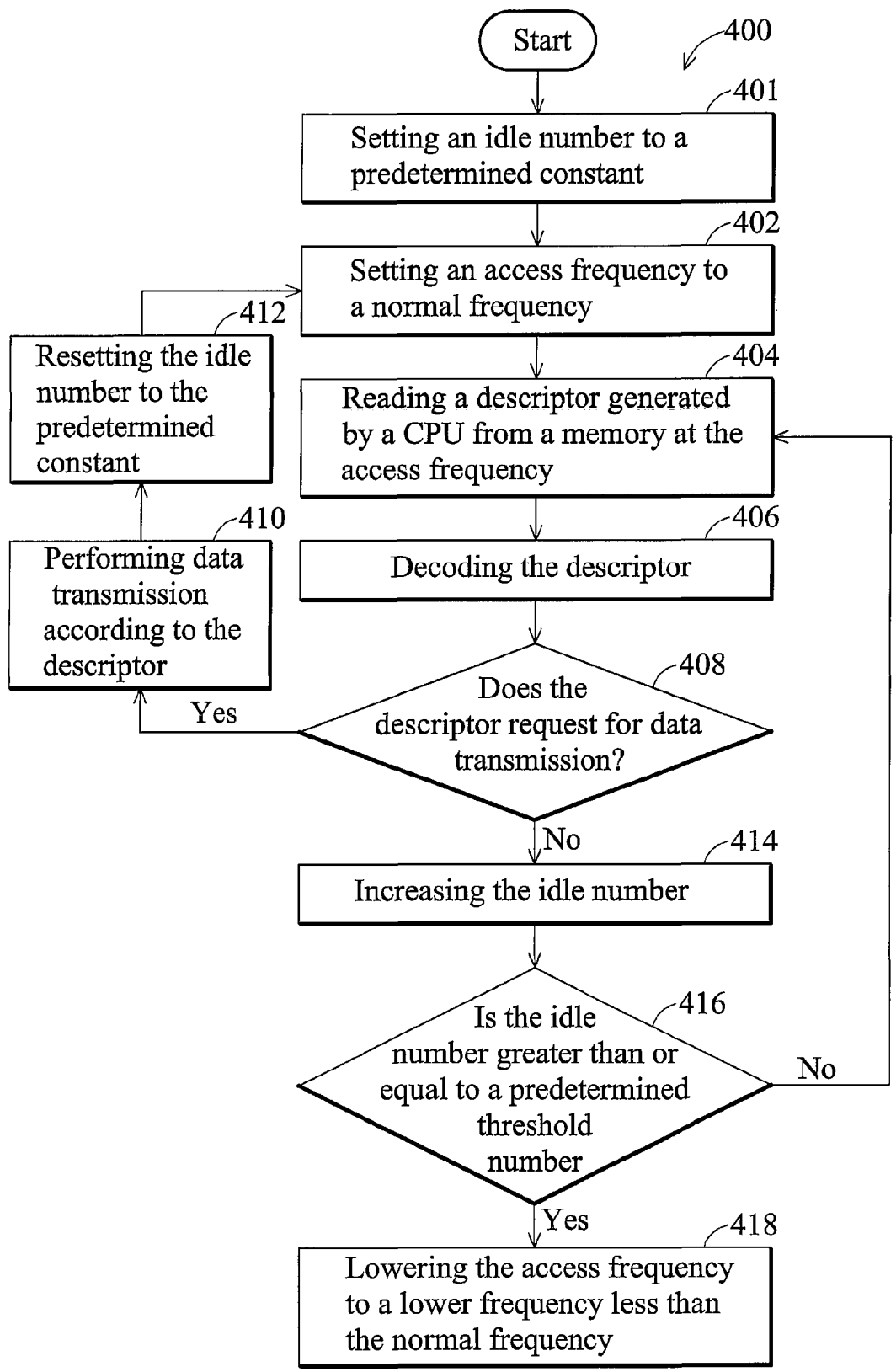
FIG. 4 is a flowchart of another embodiment of a method for reducing power consumption of a computer system according to the invention.

In one embodiment, the peripheral device 206 is a USB device, and the peripheral device controller 216 is a USB controller. Referring to FIG. 4, a flowchart of another embodiment of a method 400 for reducing power consumption of a computer system 200 according to the invention is shown. The USB controller 216 sets an idle number to a predetermined constant (step 401) and sets an access frequency to a normal frequency (step 402) The USB controller 216 reads the descriptor 230 generated by the CPU 202 from the memory 208 at the access frequency (step 404). The USB controller 216 decodes the descriptor 230 to obtain information about data transmission (step 406). The USB controller 216 determines whether the descriptor 230 requests for data transmission between the CPU 202 and the USB device 206 (step 408). If data transmission is requested and the descriptor 230 is not a null descriptor, the USB controller 216 handles data transmission between the USB device 206 and the CPU 202 according to the descriptor 230 (step 410) and resets the idle number to the predetermined constant (step 412). The access frequency is set to the normal frequency (step 402) Otherwise, if the descriptor 230 does not request data transmission, the descriptor 230 is a null descriptor, and the USB controller 216 increases the idle number by one (step 414).

Because the idle number indicates a number of times of occurrence of a null descriptor, the USB controller 216 can determine whether data transmission between the CPU 202 and the USB device 206 is performed as a reference for adjusting the access frequency of the descriptor 230. When the idle number is greater than or equal to a predetermined threshold number (step 416), no data transmission between the CPU 202 and the USB device 206 is performed, and the USB controller 216 lowers the access frequency to a lower frequency less than the normal frequency (step 418). The USB controller 216 accesses the memory 208 in a low frequency. Because lowering the access frequency allows the operating system to enter into a C3 sleep status or a C4 deep-sleep status, power consumption of the CPU 202 is reduced.

Figure 5:
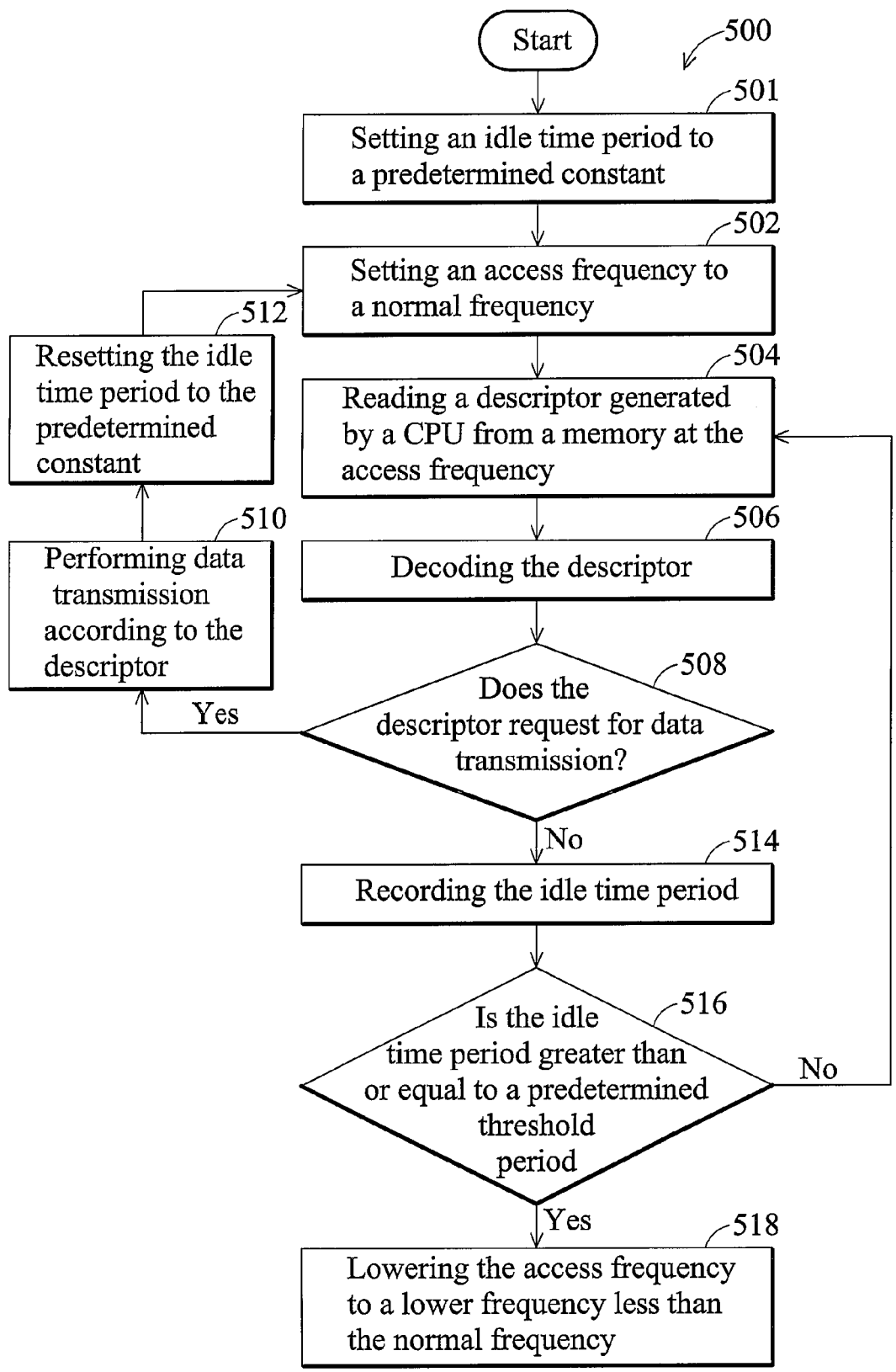
FIG. 5 is a flowchart of another embodiment of a method for reducing power consumption of a computer system according to the invention.

In another embodiment, the peripheral device 206 is a USB device, and the peripheral device controller 216 is a USB controller. Referring to FIG. 5, a flowchart of another embodiment of a method 500 for reducing power consumption of a computer system 200 according to the invention is shown. The USB controller 216 sets an idle time period to a predetermined constant (step 501) and sets an access frequency to a normal frequency (step 502). The USB controller 216 reads the descriptor 230 generated by the CPU 202 from the memory 208 at the access frequency (step 504). The USB controller 216 decodes the descriptor 230 to obtain information about data transmission (step 506). The USB controller 216 determines whether the descriptor 230 requests for data transmission between the CPU 202 and the USB device 206 (step 508). If data transmission is requested and the descriptor 230 is not a null descriptor, the USB controller 216 handles data transmission between the USB device 206 and the CPU 202 according to the descriptor 230 (step 510) and resets the idle time period to the predetermined constant. (step 512) The access frequency is set to the normal frequency (step 502). Otherwise, if the descriptor 230 does not request data transmission, the descriptor 230 is a null descriptor, and the USB controller 216 records the idle time period (step 514).

Because idle time period indicates a number of times of occurrence of a null descriptor, the USB controller 216 can determine whether data transmission between the CPU 202 and the USB device 206 is performed as a reference for adjusting the access frequency of the descriptor 230. When the idle time period is greater than or equal to a predetermined threshold period (step 516), no data transmission between the CPU 202 and the USB device 206 is performed, and the USB controller 216 lowers the access frequency to a lower frequency less than the normal frequency (step 518). The USB controller 216 accesses the memory 208 in a low frequency. Because lowering the access frequency allows the operating system to enter into a C3 sleep status or a C4 deep-sleep status, power consumption of the CPU 202 is reduced.

Figure 6:
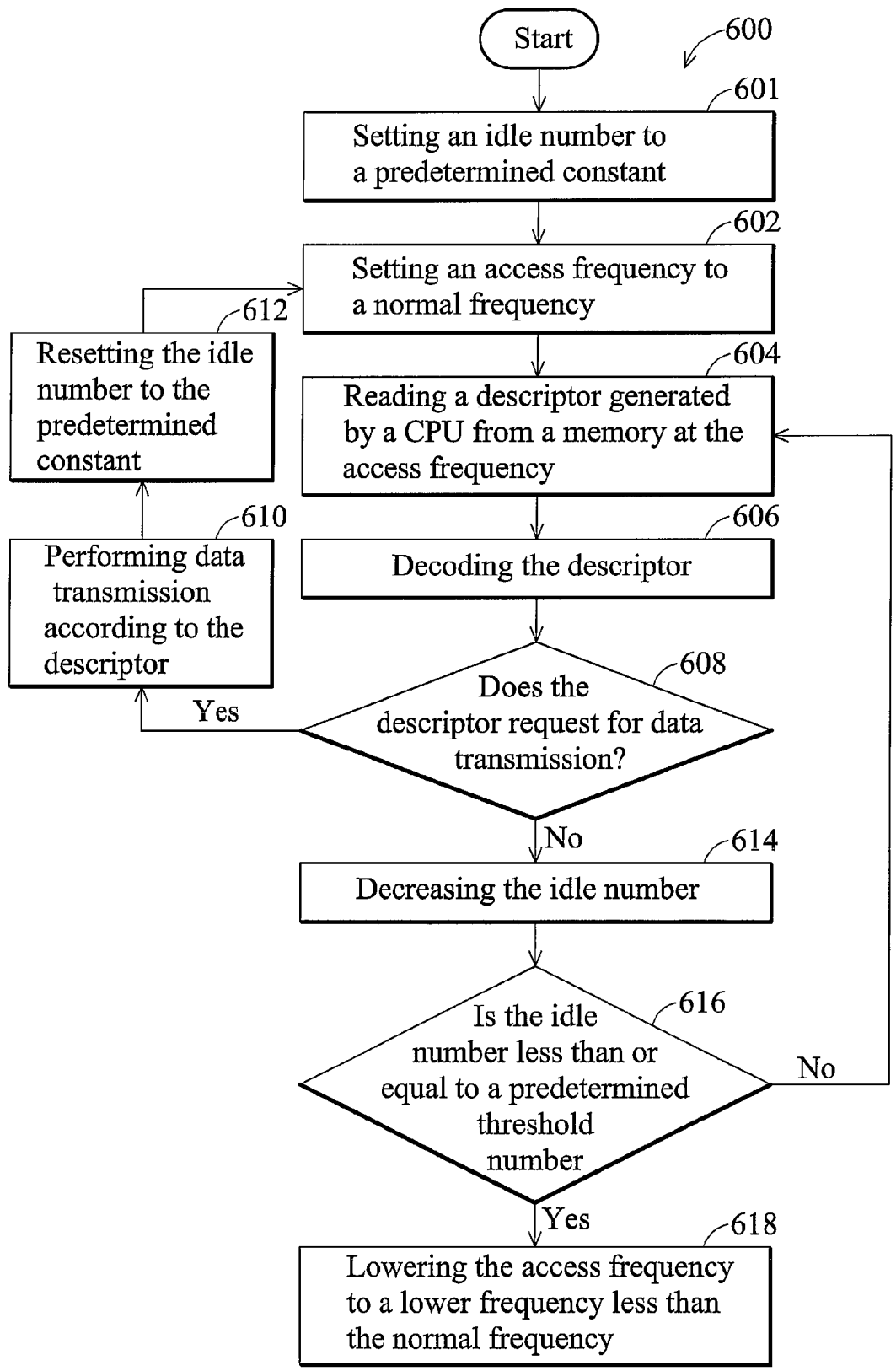
FIG. 6 is a flowchart of another embodiment of a method for reducing power consumption of a computer system according to the invention.

In another embodiment, the peripheral device 206 is a USB device, and the peripheral device controller 216 is a USB controller. Referring to FIG. 6, a flowchart of another embodiment of a method 600 for reducing power consumption of a computer system 200 according to the invention is shown. The USB controller 216 sets an idle number to a predetermined constant (step 601) and sets an access frequency to a normal frequency (step 602). The USB controller 216 reads the descriptor 230 generated by the CPU 202 from the memory 208 at the access frequency (step 604). The USB controller 216 decodes the descriptor 230 to obtain information about data transmission (step 606). The USB controller 216 determines whether the descriptor 230 requests for data transmission between the CPU 202 and the USB device 206 (step 608). If data transmission is requested and the descriptor 230 is not a null descriptor, the USB controller 216 handles data transmission between the USB device 206 and the CPU 202 according to the descriptor 230 (step 610) and resets the idle number to the predetermined constant (step 612). The access frequency is set to the normal frequency (step 602). Otherwise, if the descriptor 230 does not request data transmission, the descriptor 230 is a null descriptor, and the USB controller 216 decreases the idle number by one (step 614).

Because the idle number indicates a number of times of occurrence of a null descriptor, the USB controller 216 can determine whether data transmission between the CPU 202 and the USB device 206 is performed as a reference for adjusting the access frequency of the descriptor 230. When the idle number is less than or equal to a predetermined threshold number (step 616), no data transmission between the CPU 202 and the USB device 206 is performed, and the USB controller 216 lowers the access frequency to a lower frequency less than the normal frequency (step 618). The USB controller 216 accesses the memory 208 in a low frequency. Because lowering the access frequency allows the operating system to enter into a C3 sleep status or a C4 deep-sleep status, power consumption of the CPU 202 is reduced.

Thus, the invention can avoid the operation of accessing the memory in a normal frequency. When the computer enters an idle state, the controller will reduce the frequency of reading the descriptor from the memory and will not prohibit the CPU from entering a sleep status or a deep-sleep status like the conventional method. Thus, when a peripheral device is coupled to the computer system, the CPU can still enter a sleep status or a deep-sleep status to reduce the power consumption.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A method for reducing power consumption of a computer system, wherein when a central processing unit (CPU) requests a peripheral device for data transmission therebetween, the CPU stores information about the data transmission in a descriptor in a memory, and a peripheral device controller handles the data transmission according to the descriptor, comprising:
   directing the peripheral device controller to read the descriptor from the memory at an access frequency;
   passing the descriptor to the peripheral device;
   storing a response of the peripheral device in the descriptor;
   determining whether the descriptor read from the memory indicates that the CPU requests for data transmission;
   if the descriptor does not indicate that the CPU requests for data transmission, increasing an idle number;
   if the descriptor indicates that the CPU requests for data transmission, handling the data transmission according to the descriptor and resetting the idle number to a predetermined constant; and
   lowering the access frequency at which the peripheral device controller reads the descriptor from the memory if the idle number indicates that a total number of descriptors which do not request for data transmission is greater than or equal to a threshold.

2. The method as claimed in claim 1, wherein the computer system comprises the CPU, the peripheral device, the peripheral device controller, and the memory.

3. The method as claimed in claim 1, wherein the handling step comprising:
   when data transmission is performed, setting the access frequency to a normal frequency.

4. A computer system, comprising:
   a memory;
   a peripheral device;
   a central processing unit (CPU), wherein when data transmission between the CPU and the peripheral device is required, storing information about the data transmission in a descriptor in the memory, and determining whether the descriptor read from the memory indicates that the CPU requests for data transmission; and
   a peripheral device controller, coupled to the memory and the peripheral device, reading the descriptor from the memory at an access frequency, passing the descriptor to the peripheral device, storing a response of the peripheral device in the descriptor, increasing an idle number if the descriptor does not indicate that the CPU requests for data transmission, handling the data transmission according to the descriptor and resetting the idle number to a predetermined constant if the descriptor indicates that the CPU requests for data transmission, and lowering the access frequency at which the peripheral device controller reads the descriptor from the memory if the idle number indicates that a total number of descriptors which do not request for data transmission is greater than or equal to a threshold.

5. The computer system as claimed in claim 4, wherein the peripheral device controller sets the access frequency to a normal frequency when data transmission is performed.

6. A control device, installed in a computer system, coupled to a central processing unit (CPU), a memory, and a peripheral device, wherein when the CPU requests the peripheral device for data transmission therebetween, the CPU stores information about the data transmission in a descriptor in the memory, and determines whether the descriptor read from the memory indicates that the CPU requests for data transmission, comprising:
   a peripheral device controller, coupled to the memory and the peripheral device, reading the descriptor from the memory at an access frequency, passing the descriptor to the peripheral device, storing a response of the peripheral device in the descriptor, increasing an idle number if the descriptor does not indicate that the CPU requests for data transmission, handling the data transmission according to the descriptor and resetting the idle number to a predetermined constant if the descriptor indicates that the CPU requests for data transmission, and lowering the access frequency at which the peripheral device controller reads the descriptor from the memory if the idle number indicates that a total number of descriptors which do not request for data transmission is greater than or equal to a threshold, wherein the descriptor includes information of type of the data transmission and length of data transmitted in the data transmission; and
   a processor bus controller, coupled to the CPU, controlling data transmission of the CPU.

7. The control device as claimed in claim 6, wherein the peripheral device controller sets the access frequency to a normal frequency when data transmission is performed, and the peripheral device controller lowers the access frequency to a low frequency less than the normal frequency when the idle number is greater than or equal to a predetermined threshold number.

8. The method as claimed in claim 1, wherein when the descriptor does not request for data transmission, the descriptor is a null descriptor.

9. The method as claimed in claim 4, wherein when the descriptor does not request for data transmission, the descriptor is a null descriptor.

10. The method as claimed in claim 6, wherein when the descriptor does not request for data transmission, the descriptor is a null descriptor.

\* \* \* \* \*